United States Patent
Dillon, Jr. et al.

(10) Patent No.: US 11,210,198 B2
(45) Date of Patent: Dec. 28, 2021

(54) DISTRIBUTED WEB PAGE PERFORMANCE MONITORING METHODS AND SYSTEMS

(71) Applicant: salesforce.com, inc., San Francisco, CA (US)

(72) Inventors: Robert Gerald Dillon, Jr., Kirkland, WA (US); Ankit Sawhney, San Francisco, CA (US); Chandramohan Dhandapani, Suwanee, GA (US)

(73) Assignee: salesforce.com, inc, San Francisco, CA (US)

( * ) Notice: Subject to any disclaimer, the term of this patent is extended or adjusted under 35 U.S.C. 154(b) by 349 days.

(21) Appl. No.: 16/262,706

(22) Filed: Jan. 30, 2019

(65) Prior Publication Data

US 2020/0241996 A1 Jul. 30, 2020

(51) Int. Cl.
*G06F 11/24* (2006.01)
*G06F 11/34* (2006.01)

(52) U.S. Cl.
CPC ...... *G06F 11/3466* (2013.01); *G06F 11/3414* (2013.01); *G06F 11/3419* (2013.01)

(58) Field of Classification Search
CPC ............. G06F 11/3414; G06F 11/3419; G06F 11/3466; G06F 2201/875; H04L 67/02; H04L 67/10
USPC ....................................................... 702/186
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — John H Le
(74) *Attorney, Agent, or Firm* — LKGlobal | Lorenz & Kopf, LLP

(57) ABSTRACT

Computing systems, database systems, and related methods are provided for tracking performance associated with loading or updating a web page in a distributed manner. An exemplary method involves a server providing the web page to a client over a network. The web page includes code executable by the client to provide requests to the server over the network, assign identifiers to the requests, and determine client-side performance metrics associated with the requests. The server provides one or more responses corresponding to the requests to the client over the network, determines server-side performance metrics associated with providing the responses, receives the client-side performance metrics from the client after providing the responses, and maintains the associations between the client-side performance metrics, the server-side performance metrics, and the respective server requests using the identifiers assigned by the client.

20 Claims, 4 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,973,568 B2 * | 5/2018 | Letca ................. G06F 11/3466 |
| 10,313,211 B1 * | 6/2019 | Rastogi ................. H04L 43/08 |
| 10,372,600 B2 * | 8/2019 | Mathur ............... G06F 11/3409 |
| 10,592,377 B2 * | 3/2020 | Cook ..................... H04L 67/22 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0099818 A1 * | 7/2002 | Russell ................ H04L 69/329 709/224 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0097088 A1 * | 5/2005 | Bennett ................. G06F 16/957 |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobsen |
| 2009/0177744 A1 | 7/2009 | Marlow et al. |
| 2011/0055470 A1 * | 3/2011 | Portolani ............... H04L 43/106 711/108 |
| 2011/0247051 A1 | 10/2011 | Bulumulla et al. |
| 2012/0042218 A1 | 2/2012 | Cinarkaya et al. |
| 2012/0136602 A1 * | 5/2012 | Hossain ............... G06F 11/3616 702/85 |
| 2012/0218958 A1 | 8/2012 | Rangaiah |
| 2012/0233137 A1 | 9/2012 | Jakobsen et al. |
| 2013/0212497 A1 | 8/2013 | Zelenko et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2013/0247216 A1 | 9/2013 | Cinarkaya et al. |

* cited by examiner

DISTRIBUTED WEB PAGE PERFORMANCE MONITORING METHODS AND SYSTEMS

TECHNICAL FIELD

Embodiments of the subject matter described herein relate generally to cloud computing and database systems, and more particularly, to methods and systems that support distributed monitoring of web page performance.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

It is desirable to minimize the amount of time or delay involved when a client attempts to load a web page or obtain other data from the cloud. However, monitoring performance of web page loading, data retrieval, and the like utilizes resources, which, in turn, further increases the amount of time or delay perceived by a user, thereby degrading the user experience. Accordingly, it is desirable to monitor performance in a manner that maintains a satisfactory user experience.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
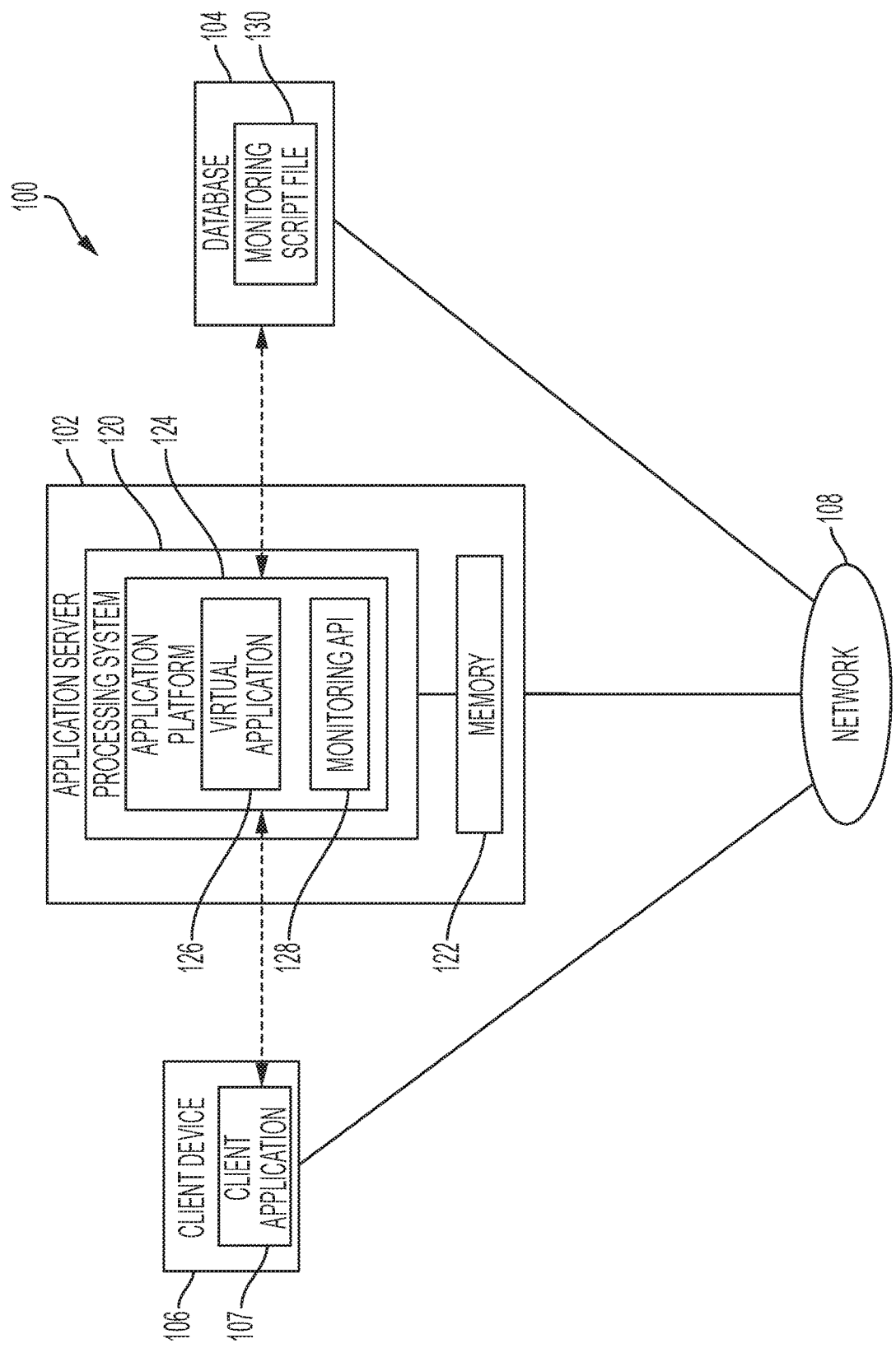
FIG. 1 is a block diagram of an exemplary computing system.

Embodiments of the subject matter described herein generally relate to database systems and methods for tracking the performance associated with the retrieval and processing of a computer file, such as a web page, over a communications network. In exemplary embodiments, a server provides a web page that includes code executable by web browser or similar application at a client device to provide one or more requests to the server over the network for data, files, and/or other information required to generate or otherwise present the web page. The code also causes the client application to monitor and determine a set of performance metrics associated with those server requests.

For example, as described in greater detail below in the context of FIGS. 1-3, in exemplary embodiments, the code includes a script or reference to a computer file that includes scripting language (e.g., a JavaScript file) provided within an initial portion of the web page code that, when executed by the client application, cause the client application to assign identifiers to subsequent server requests and track the amount of time associated with those server requests. In this regard, for each request provided to the server, the client application may determine a browser processing time (BPT) associated with that request based on the amount of time elapsed from when the client application initiates the server request until the client application finishes processing the received server response to that request. In exemplary embodiments, the code also causes the client application to track the amount of time elapsed from when an initial triggering event for loading or updating the web page occurs until the client application finishes loading or processing the web page code, alternatively referred to herein as the experienced page time (EPT). In this regard, the EPT represents a user's perceived amount of time required for the web page to load or update before the user can subsequently interact with the web page.

As described in greater detail below primarily in the context of FIGS. 1 and 3, in exemplary embodiments, the client application at the client device communicates with an application program interface (API) at the server to support server-side performance tracking. In this regard, for each server request by the client application, the performance monitoring API at the server receives the identifier assigned to that server request and then tracks the amount of time or other performance metrics associated with the server processing and responding to the server request, such as, for example, the elapsed time between initiating processing of the request and transmitting a response back to the client application at the client device, alternatively referred to herein as the server processing time (SPT). The performance monitoring API stores or otherwise maintains the server performance metrics in association with the respective server requests. In this regard, in exemplary embodiments, after the client application finishes loading or updating the web page, the client application transmits or otherwise provides the BPT and other client-side performance metrics associated with the various server requests to the performance monitoring API for storage and/or maintenance in association with the server-side performance metrics. For example, the performance monitoring API may generate a log entry in a database or other data storage element that associates the client-side and server-side performance metrics with the identifier to the corresponding server request, and thereby uniformly formats and maintains the relationships between client-side and server-side performance metrics for retrospective analysis.

By virtue of the performance monitoring being distributed among the client and server sides, the perceived performance degradation by a user on the client-side is reduced by balancing the resources used for performance monitoring relative to overburdening any one of the client or server sides. Additionally, having both client and server sides track performance metrics associated with individual requests provides improved granularity and differentiation between the amount of time attributable to the client-side processing versus the amount of time attributable to the server-side processing. The performance monitoring API is also capable of assembling and formatting the performance data in a manner that allows for the performance data to be integrated or incorporated into any number of different database systems for storage or visualizations. In this regard, maintaining associations between server requests and corresponding performance metrics as well as differentiating between client- and server-side performance metrics allows for drill downs into the details of what request, behavior, or actor is the primary contributor to the overall timing.

FIG. 1 depicts an exemplary embodiment of a computing system 100 capable of monitoring performance associated with a client device 106 retrieving or otherwise accessing a computer file provided by or on a server 102 communicatively coupled to the client device 106 over a communications network 108. The communications network 108 may be realized as any sort or combination of wired and/or wireless computer network, a cellular network, a mobile broadband network, a radio network, the Internet, or the like. It should be noted that FIG. 1 is a simplified representation of a computing system 100 for purposes of explanation and is not intended to be limiting. For example, in practice, multiple instances of client devices 106 communicating on the network 108 may be present, with any number of instances of applications being provided by the server 102 to various instances of client devices 106. Additionally, practical implementations may include multiple instances of the server 102 and/or the database 104, which, in turn may reside behind or rely on one or more load balancers to manage resource utilization, as will be appreciated in the art.

The server 102 generally represents a computing device, computing system or another combination of processing logic, circuitry, hardware, and/or other components configured to support the processes, tasks, operations, and/or functions described herein. In this regard, the server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random-access memory (RAM), read only memory (ROM), flash memory, magnetic or optical mass storage, or any other suitable non-transitory short or long-term data storage or other computer-readable media, and/or any suitable combination thereof. In one or more embodiments, the programming instructions cause the processing system 120 to create, generate, or otherwise facilitate an application platform 124 that is capable of supporting, generating, or otherwise providing instances of a virtual application 126 at run-time (or "on-demand") based at least in part upon code and other data that is stored or otherwise maintained by the database 104, such that the server 102 functions as an application server 102. In exemplary embodiments, the programming instructions also cause the processing system 120 to create, generate, or otherwise facilitate a performance monitoring application program interface (API) 128 that supports tracking or otherwise monitoring performance metrics associated with the server 102 providing web pages or other files, data, and/or information to the client device 106, as described in greater detail below. Depending on the embodiment, the performance monitoring API 128 can be integrated with or otherwise incorporated as part of a virtual application 126, or be realized as a separate or standalone component that is capable of interacting with the client device 106 independent of any virtual application 126.

The client device 106 generally represents an electronic device coupled to the network 108 that may be utilized by a user to access the application platform 124 on the application server 102 to thereby access instances of virtual applications 126 supported by the application server 102 and/or retrieve data from the database 104 via the network 108. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 106. The illustrated client device 106 executes or otherwise supports a client application 107 that communicates with the application platform 124 on the server 102 using a networking protocol. In some embodiments, the client application 107 is realized as a web browser or similar local client application executed by the client device 106 that contacts the application server 102 and/or application platform 124 using a networking protocol, such as the hypertext transport protocol (HTTP) or the like.

In one or more embodiments, a user utilizes a browser application 107 to access or otherwise retrieve a computer file, such as a HyperText Markup Language (HTML) file corresponding to a web page that is generated by the application server 102 and/or the application platform 124 as part of an instance of a virtual application 126 generated at run-time (or "on-demand") based at least in part on data stored or otherwise maintained by the database 104 that is communicatively coupled to the server 102 via the communications network 108. It should be noted that although one or more embodiments may be described herein in the context of a web page integrated in a virtual application in an on-demand database system, the subject matter is not necessarily so limited, and in practice, may be implemented in an equivalent manner in any number of different database systems, cloud computing systems, and the like, and in the context of any type of document, computer file or other resource provided by a server that includes, presents, or otherwise displays elements at a client device over a network.

In exemplary embodiments, the database 104 stores or otherwise maintains data for integration with or invocation by a virtual application in objects organized in object tables. In this regard, the database 104 includes a plurality of different object tables configured to store or otherwise maintain alphanumeric values, metadata, or other descriptive information that define a particular instance of a respective type of object associated with a respective object table. For example, the virtual application may support a number of different types of objects that may be incorporated into or otherwise depicted or manipulated by the virtual application, with each different type of object having a corresponding object table that includes columns or fields corresponding to the different parameters or criteria that define a particular instance of that object. In one embodiment, the database 104 stores or otherwise maintains application objects (e.g., an application object type) where the application object table includes columns or fields corresponding to the different parameters or criteria that define a particular application 126 capable of being generated or otherwise provided by the application platform 124 on a client device 106. In this regard, the database 104 may also store or maintain graphical user interface (GUI) objects that may be associated with or referenced by a particular application object and include columns or fields that define the layout, sequencing, and other characteristics of GUI displays to be presented by the application platform 124 on a client device 106 in conjunction with that application 126. Additionally, the database 104 stores or otherwise maintains additional database objects for association and/or integration with the application 126. The database 104 also stores or otherwise maintains metadata, which may be utilized to perform data manipulation and/or formatting. For example, the metadata may include or define describe any number of workflows, process flows, formulas, business logic, structure and other database components or constructs that may be associated with a particular application database object.

In one or more embodiments, the database 104 stores or otherwise maintains a monitoring script file 130 (e.g., a JavaScript file or similar file including scripting language) that may be incorporated by reference into the HTML file corresponding to a web page to be generated by the application server 102 and/or the application platform 124 to facilitate tracking the performance associated with that web page. For example, a developer may provide a reference to the monitoring script file 130 within the HTML code for a web page to be presented in connection with the virtual application 126 to facilitate tracking of performance of that web page at run-time during generation or presentation of the web page by the client application 107 at the client device 106. In this regard, the client application 107 may include an engine or interpreter configured to execute the script or code provided by the monitoring script file 130 maintained in the database 104, and thereby initiate the performance monitoring processes described herein. In this manner, developers may enable performance tracking of a particular web page in a drop-in manner by adding reference to the monitoring script file 130 maintained by the database 104. Such embodiments also allow for the performance monitoring processes and corresponding performance monitoring API 128 to be implemented and maintained independent of the web page code.

Figure 2:
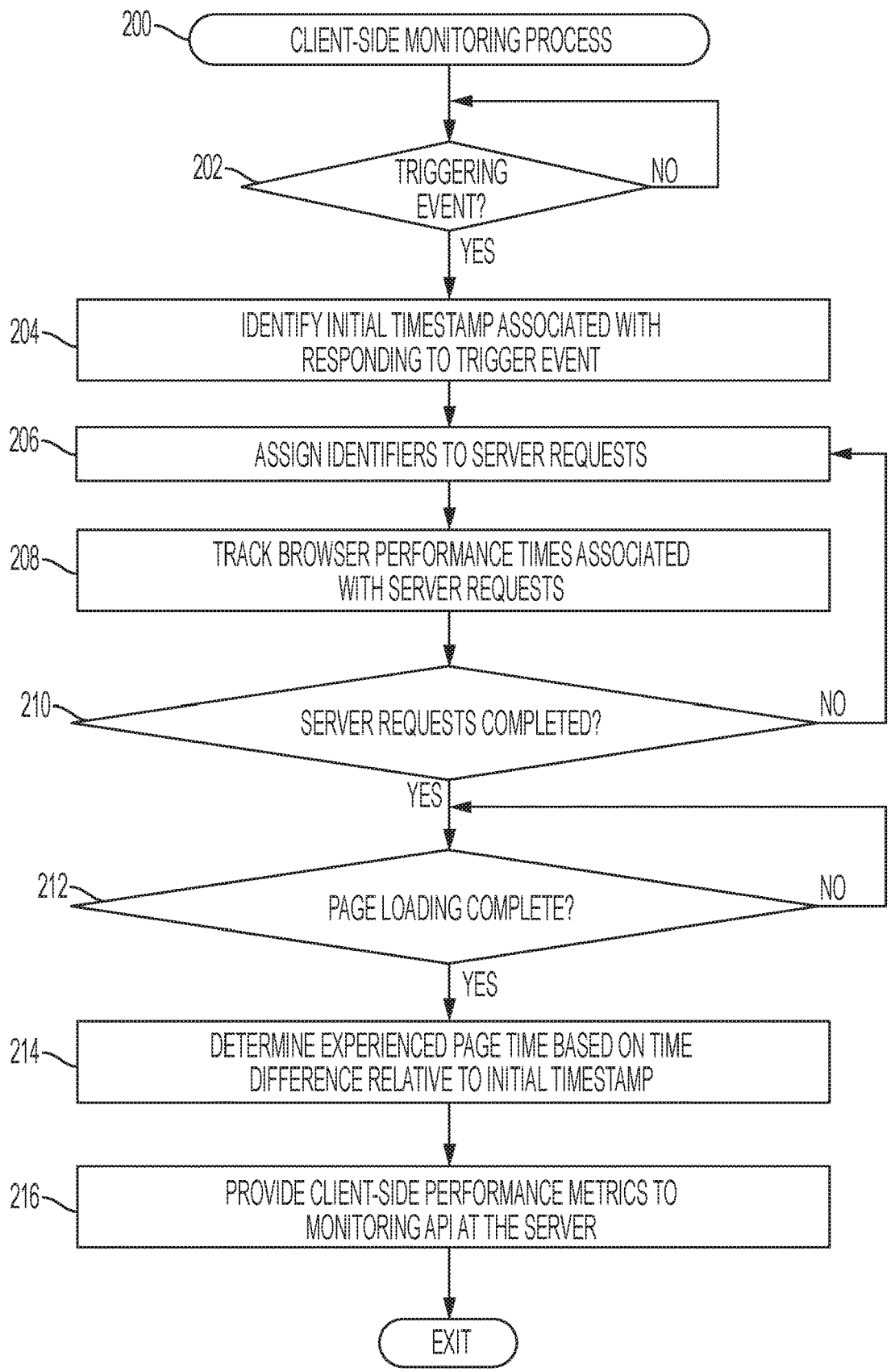
FIG. 2 is a flow diagram of an exemplary client-side monitoring process suitable for implementation in the computing system of FIG. 1 in accordance with one or more embodiments.

FIG. 2 depicts an exemplary embodiment of a client-side monitoring process 200 suitable for implementation in the computing system 100 to track or otherwise monitor performance of a web page at a client device 106. For illustrative purposes, the following description may refer to elements mentioned above in connection with FIG. 1. In this regard, while portions of the client-side monitoring process 200 may be performed by different elements of the computing system 100, for purposes of explanation, the subject matter is described herein in the context of the client-side monitoring process 200 being primarily performed by the client device 106 and/or the client application 107. It should be appreciated that the client-side monitoring process 200 may include any number of additional or alternative tasks, the tasks need not be performed in the illustrated order and/or the tasks may be performed concurrently, and/or the client-side monitoring process 200 may be incorporated into a more comprehensive procedure or process having additional functionality not described in detail herein. Moreover, one or more of the tasks shown and described in the context of FIG. 2 could be omitted from a practical embodiment of the client-side monitoring process 200 as long as the intended overall functionality remains intact.

In the illustrated embodiment, the client-side monitoring process 200 monitors for a triggering event for tracking the performance of a web page (task 202). In this regard, the triggering event could be an initial page loading, a refresh of the web page or other dynamic update to the web page, or another triggering event associated with the web page that may be detected or otherwise identified by the client application 107. For example, the monitoring script may cause the client application 107 to monitor for a mouse click event or other user input events that are configured to initiate the performance monitoring described herein. In this regard, the monitoring script may specify browser events that trigger the performance monitoring processes, such as, for example, mouse click events, keyboard events, JavaScript animations, and the like. In response to detecting a triggering event, the client-side monitoring process 200 identifies or otherwise obtains an initial time associated with the client-side processing responsive to the triggering event (task 204). For example, the client application 107 may store or otherwise maintain the timestamp associated with a mouse click event, a web page refresh or the like as the initial reference time for determining the experienced page time (EPT) or other performance metrics characterizing the overall user experience or time required to finish responding to the triggering event.

The client-side monitoring process 200 continues by generating or otherwise creating unique identifiers to be assigned to different requests provided to the server in connection with responding to the triggering event and then tracks, obtains, or otherwise records browser performance times associated with those requests using the assigned identifiers (tasks 206, 208). In this regard, the monitoring script executed by the client application 107 is configured to identify XMLHttpRequest (XHR) calls or other requests for information from the server 102 within the web page code during execution, and for each request made to the server 102, assign a unique tracing identifier that may be utilized to track performance times associated with that server request. For example, the client application 107 may store or otherwise record the timestamp corresponding to the time when the client application 107 transmits the server request via the network 108, the timestamp corresponding to the time when the client application 107 receives a response to the request from the server 102 via the network 108, and the timestamp corresponding to the time when the client application 107 finished processing the response (e.g., the time when rendering within the web browser GUI display is finished) in association with the tracing identifier for that request. Additionally, in exemplary embodiments, the client application 107 also transmits or otherwise provides the tracing identifier for each server request to the performance monitoring API 128 in connection with providing the request to the server 102. As described in greater detail below, the performance monitoring API 128 utilizes the same tracing identifier to monitor or track server-side performance metrics associated with responding to the request so that the client-side and server-side performance metrics for that same request can be subsequently collated for analyzing and/or drilling down into performance associated with that request.

In exemplary embodiments, the repeats the tasks of assigning tracing identifiers to server requests and tracking client-side performance metrics associated with those server requests until all of the server requests associated loading or updating the web page in response to the triggering event have been completed (task 210). Thereafter, the client-side monitoring process 200 detects or otherwise identifies when the loading of the web page is fully complete prior to determining the overall performance metrics associated with the web page (task 212). In this regard, the monitoring script waits for any rendering or other thrashing by the client application 107 is completed before identifying the resulting timestamp as the time when the processing of the web page is finished. Based on the difference relative to the initial timestamp for initiating the loading or updating of the web page, the client application 107 calculates or otherwise determines the experienced page time (EPT) and/or other performance metrics that characterize the overall performance of loading and/or updating the web page.

After the collection or determination of the client-side performance metrics is completed, the client-side monitoring process 200 transmits or otherwise provides the set of client-side performance metrics to the server (task 214). In this regard, the monitoring script executed by the client application 107 causes the client application 107 to transmit or otherwise provide the performance metrics associated with each of the individual server requests along with the overall performance metrics to the performance monitoring API 128 at the server 102 for collating and maintaining the client-side performance metrics in association with server-side performance metrics, as described in greater detail below.

Figure 3:
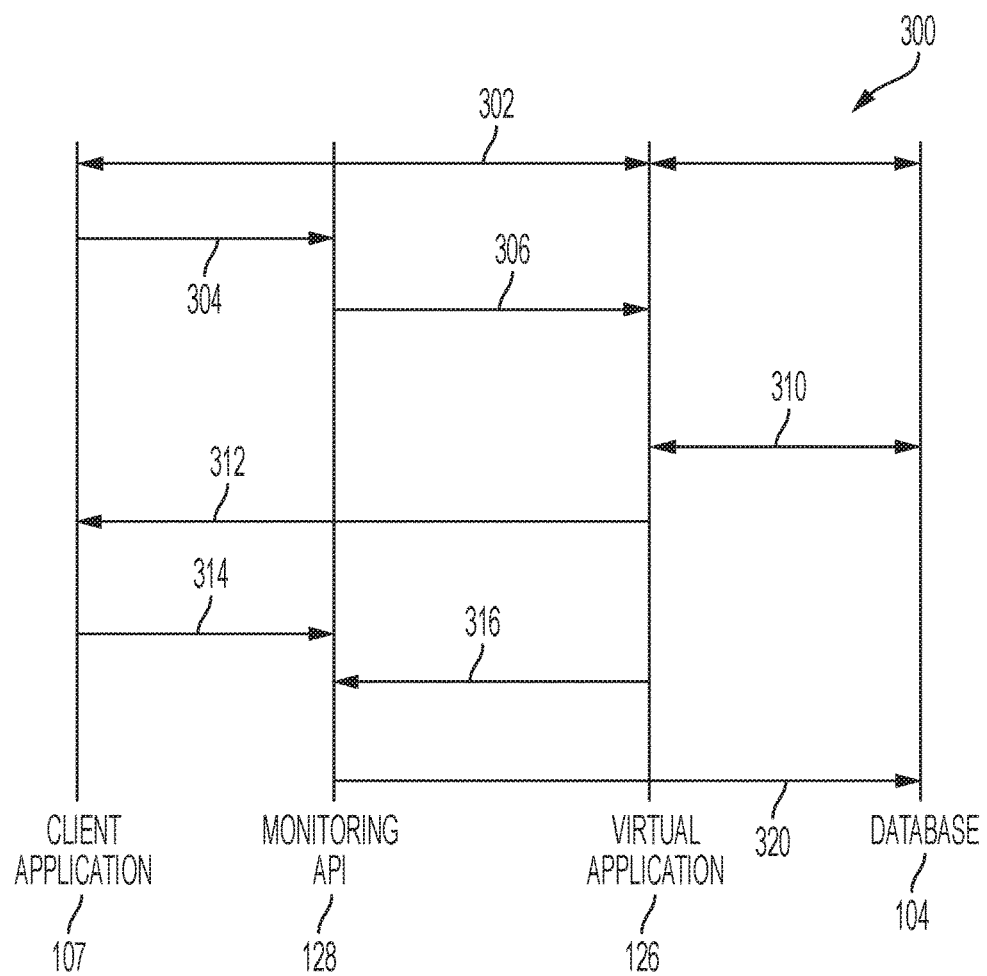
FIG. 3 depicts an exemplary sequence of communications within the computing system of FIG. 1 in connection with one or more embodiments of the client-side monitoring process of FIG. 2.

FIG. 3 depicts an exemplary sequence 300 of communications within the computing system 100 in accordance with one or more embodiments. As described above, the illustrated sequence 300 begins with the client application 107 at the client device 106 downloading, accessing, or otherwise obtaining 302 a monitoring script file 130 maintained in the database 104 that is referred to or otherwise incorporated into the code for the web page associated with the virtual application 126 to be provided at the client device 106. For example, a user may input or otherwise provide a network address associated with a web page file for the virtual application 126 provided by the server 102 into the browser application 107, which, in turn results in the browser application 107 contacting the server 102 over the network 108 to obtain the web page file associated with the virtual application 126. In one or more embodiments, the web page code includes a reference to the monitoring script file 130 in the database 104 or otherwise incorporates the executable script from the monitoring script file 130 within the web page code that precedes subsequent executable code portions for requesting data from the server 102 and/or database 104 for rendering the web page. Thus, during execution and/or rendering of the web page code by the browser application 107, the browser application 107 may request the monitoring script file 130 from the database 104 via the server 102 and/or virtual application 126 prior to executing subsequent code for rendering the web page. Execution of the monitoring script 130 by the client application 107 during execution of the web page code causes the client application 107 to monitor for an event that triggers loading, updating, or other changes to the web page presented by the client application 107, and after detecting a triggering event, assign unique tracing identifiers to server requests during subsequent execution of the web page code. In this regard, in response to a triggering event, the client application 107 may record or otherwise store the timestamp associated with the triggering event before generating a unique tracing identifier to be assigned to an initial server request. The client application 107 may also record or otherwise store the timestamp associated with transmitting 304 the request including the unique tracing identifier to the application server 102 and/or application platform 124.

The monitoring API 128 receives the request and utilizes the unique tracing identifier provided by the client application 107 to manage the tracking and determination of server-side performance metrics for responding to the request. For example, when the server request involves a call to the database 104 (e.g., to obtain data or information for populating a portion of the GUI display associated with the web page), the monitoring API 128 may transmit or otherwise provide 306 the unique tracing identifier along with request to the virtual application 126, which, in turn, queries or otherwise accesses 310 the database 104 to obtain the data for responding to the request from the client, and then processes or otherwise acts on the data obtained from the database 104 before transmitting or otherwise providing 312 a response to the client that includes or is otherwise influenced by the data obtained from the database 104. While the virtual application 126 is in the process of responding to the request, the virtual application 126 and/or the monitoring API 128 records or stores, in association with the unique tracing identifier assigned to the request, the timestamps associated with one or more of the following: the virtual application 126 receiving the client's request, the virtual application 126 initiating the call to the database 104, the virtual application 126 receiving data from the database 104, and the virtual application 126 transmitting the server response to the client request. Other metrics associated with a call to the database 104 may also be recorded, such as, for example, a number of rows created, read, updated, deleted, and/or the like. In some embodiments, the database 104 may also track database performance by receiving the unique tracing identifier from the monitoring API 128 and/or the virtual application 126 and recording or storing, in association with the unique tracing identifier assigned to the request from the server 102, the timestamp associated with the initial receipt of the query or call from the virtual application 126 along with the timestamp associated with the database 104 transmitting the responsive data back to the virtual application 126, the number of rows or tables accessed or impacted by the request, and/or the like.

It should be noted that in addition to server-side tracking of database performance metrics, the virtual application 126 may similarly track performance metrics or timings associated with calls or requests sent to other servers, systems or devices on the network 108. Additionally, in some embodiments, such other external servers or systems could support the monitoring API 128 and/or the monitoring processes described herein, such that they independently track performance metrics using tracing identifiers provided by the monitoring API 128 and/or the virtual application 126 in connection with the request, and providing the performance metrics back to the monitoring API 128 and/or the virtual application 126 after or in conjunction with responding to the request.

After receiving the server response, the client application 107 stores or otherwise records the timestamp associated with receipt of the server response in association with the tracing identifier and then continues processing or otherwise acting on the received server response to continue loading or updating the web page at the client device 106. After all of the server requests are completed and the web page has finished loading or updating, the client application 107 transmits or otherwise provides 314 the various client-side performance metrics or timestamps associated with the unique tracing identifier to the monitoring API 128 at the server 102. In the illustrated embodiment, the monitoring API 128 also receives or otherwise obtains 316 the various server-side performance metrics or timestamps associated with the unique tracing identifier from the virtual application 126. In embodiments where the database 104 independently tracks performance metrics at the database 104, the monitoring API 128 may also receive or otherwise obtain the various database performance metrics or timestamps associated with the unique tracing identifier from the database 104. The monitoring API 128 then collates or otherwise converts the various timestamps or performance metrics into a universally formatted object or message. In the illustrated embodiment, the monitoring API 128 creates an entry in a performance log in the database 104 that is associated with the web page (or the network address thereof) and also stores or otherwise maintains the various client-side, server-side, and/or database performance metrics associated with particular server requests in association with the unique tracing identifiers assigned to the respective requests. For example, in one embodiment, each instance of a web page loading in a browser tab is assigned an initial identifier upon initiation of the client-side monitoring process 200, which is then utilized as a parent identifier for associating the various requests and tracing identifiers that thereafter emanate from that web page browser session in a single log entry associated with that session. In this regard, it should be noted that any number of different hierarchical or parent-child relationships may be created that enable establishing temporal or logical associations between requests as well as tracking performance of a particular web page with respect to time.

In various embodiments, the monitoring API 128 may transmit or otherwise provide the performance metrics to another external system in a universally formatted for ingestion, integration or other processing by that system. For example, the monitoring API may generate a message formatted using a JavaScript Object Notation (JSON) data format that includes the client-side, server-side and database performance metrics and the unique tracing identifiers, with the JSON data message being parsed, processed, ingested or otherwise integrated by another system on the network 108.

By virtue of the timings or performance metrics being independently tracked at each of the client device 106 and the server 102, the load associated with performance monitoring at any one of the components 102, 106 in the computing system 100 may be minimized, thereby allowing a developer to incorporate performance monitoring without significantly degrading the user experience. Moreover, the different performance metrics or timestamps may be utilized to granularly drill down into the performance of a particular request to identify which of the components 102, 104, 106 required a disproportionate or undesirably long amount of time during execution of the request, or conversely, to identify which of the components 102, 104, 106 is most expeditiously executing its workload. In this regard, some embodiments may allow a developer to isolate performance metrics to individual users, web pages, database calls, or the like, and/or particular combinations thereof. Thus, a developer may more efficiently identify what issues may need to be addressed and proactively respond (e.g., rather than waiting for complaints by end users or customers). The timings or performance metrics may also be analyzed with respect to time for a common server request, thereby allowing a developer to track performance with respect to time or other benchmarks (e.g., service level agreements).

It should be noted that the subject matter described herein is not limited to any particular number, type, or combination of performance metrics being tracked. That said, in one or more exemplary embodiments, the client-side performance metrics include the time between an initial fetch request until a static HTML was received, a time required to initially render a web page (bootstrap time), a timestamp for the start of an XHR call, a time until receiving a server reply to the XHR call, and a timestamp for when rendering responsive to the XHR call is completed. Exemplary server-side performance metrics include the time from when the server starts processing a request until when its response is finished being sent to the client.

Figure 4:
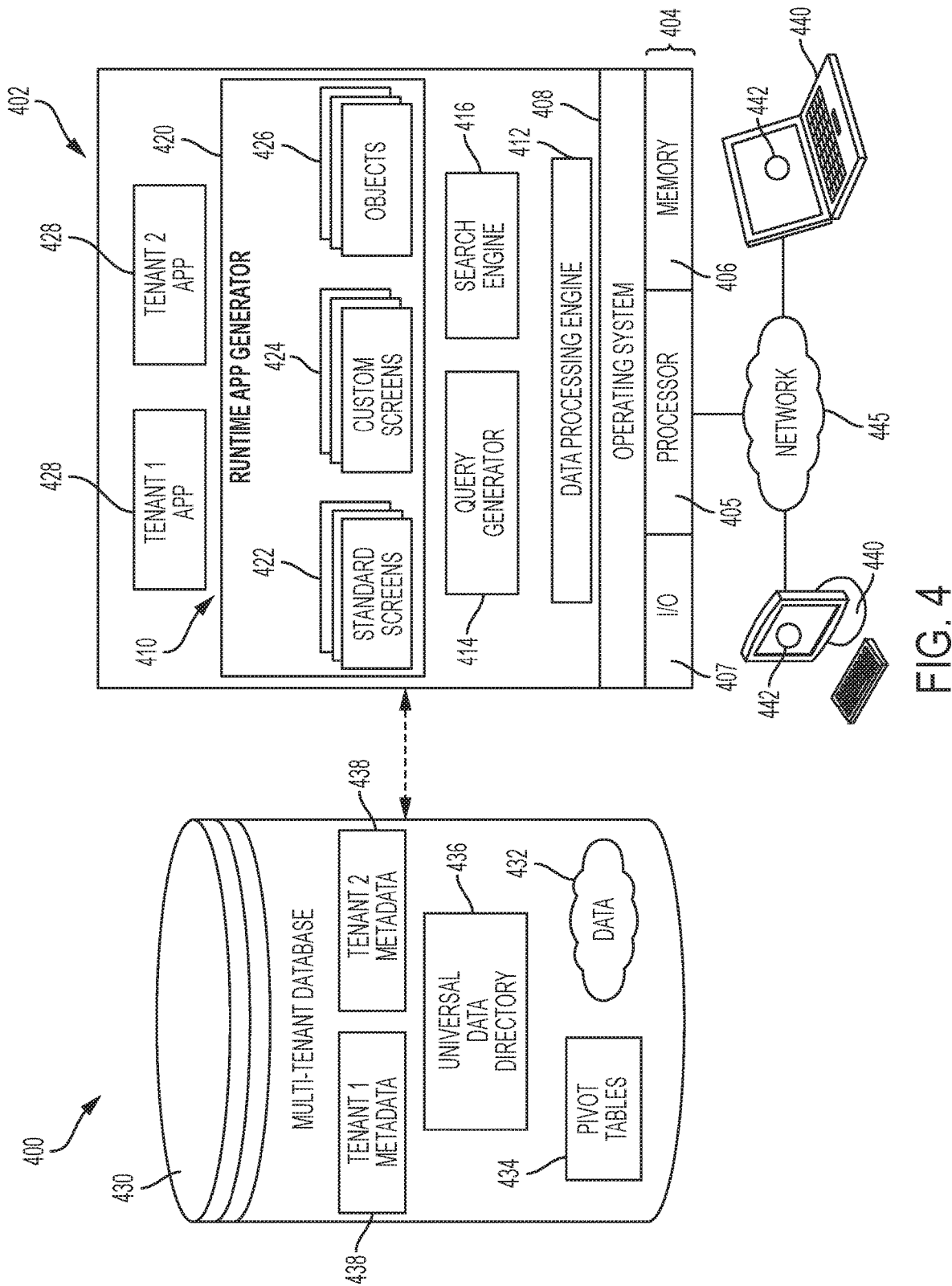
FIG. 4 is a block diagram of an exemplary multi-tenant system suitable for use with the computing system of FIG. 1 in accordance with one or more embodiments.

FIG. 4 depicts an exemplary embodiment of an on-demand multi-tenant database system 400 suitable for use with the computing system 100 of FIG. 1 and the monitoring processes described herein. The illustrated multi-tenant system 400 of FIG. 4 includes a server 402, such as server 102, that dynamically creates and supports virtual applications 428 based upon data 432 from a common database 430 (e.g., database 104) that is shared between multiple tenants, alternatively referred to herein as a multi-tenant database. Data and services generated by the virtual applications 428 are provided via a network 445 (e.g., network 108) to any number of client devices 440 (e.g., client device 106), as desired. Each virtual application 428 is suitably generated at run-time (or on-demand) using a common application platform 410 (e.g., application platform 124) that securely provides access to the data 432 in the database 430 for each of the various tenants subscribing to the multi-tenant system 400. In this regard, depending on the embodiment, the client-side monitoring process 200 may be utilized in connection with virtual applications 428 provided by or on the application platform 410, or a virtual application 428 generated by the application platform 410 may be utilized to review and analyze performance data maintained in the database 430. In accordance with one non-limiting example, the multi-tenant system 400 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 430. In this regard, each tenant includes one or more users associated with, assigned to, or otherwise belonging to that respective tenant. To put it another way, each respective user within the multi-tenant system 400 is associated with, assigned to, or otherwise belongs to a particular tenant of the plurality of tenants supported by the multi-tenant system 400. Tenants may represent customers, customer departments, business or legal organizations, and/or any other entities that maintain data for particular sets of users within the multi-tenant system 400 (i.e., in the multi-tenant database 430). For example, the application server 402 may be associated with one or more tenants supported by the multi-tenant system 400. Although multiple tenants may share access to the server 402 and the database 430, the particular data and services provided from the server 402 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 432 belonging to or otherwise associated with other tenants.

The multi-tenant database 430 is any sort of repository or other data storage system capable of storing and managing the data 432 associated with any number of tenants. The database 430 may be implemented using any type of conventional database server hardware. In various embodiments, the database 430 shares processing hardware 404 with the server 402. In other embodiments, the database 430 is implemented using separate physical and/or virtual database server hardware that communicates with the server 402 to perform the various functions described herein. In an exemplary embodiment, the database 430 includes a database management system or other equivalent software capable of determining an optimal query plan for retrieving and providing a particular subset of the data 432 to an instance of virtual application 428 in response to a query initiated or otherwise provided by a virtual application 428. The multi-tenant database 430 may alternatively be referred to herein as an on-demand database, in that the multi-tenant database 430 provides (or is available to provide) data at run-time to on-demand virtual applications 428 generated by the application platform 410.

In practice, the data 432 may be organized and formatted in any manner to support the application platform 410. In various embodiments, the data 432 is suitably organized into a relatively small number of large data tables to maintain a semi-amorphous "heap"-type format. The data 432 can then be organized as needed for a particular virtual application 428. In various embodiments, conventional data relationships are established using any number of pivot tables 434 that establish indexing, uniqueness, relationships between entities, and/or other aspects of conventional database organization as desired. Further data manipulation and report formatting is generally performed at run-time using a variety of metadata constructs. Metadata within a universal data directory (UDD) 436, for example, can be used to describe any number of forms, reports, workflows, user access privileges, business logic and other constructs that are common to multiple tenants. Tenant-specific formatting, functions and other constructs may be maintained as tenant-specific metadata 438 for each tenant, as desired. Rather than forcing the data 432 into an inflexible global structure that is common to all tenants and applications, the database 430 is organized to be relatively amorphous, with the pivot tables 434 and the metadata 438 providing additional structure on an as-needed basis. To that end, the application platform 410 suitably uses the pivot tables 434 and/or the metadata 438 to generate "virtual" components of the virtual applications 428 to logically obtain, process, and present the relatively amorphous data 432 from the database 430.

Still referring to FIG. 4, the server 402 is implemented using one or more actual and/or virtual computing systems that collectively provide the dynamic application platform 410 for generating the virtual applications 428. For example, the server 402 may be implemented using a cluster of actual and/or virtual servers operating in conjunction with each other, typically in association with conventional network communications, cluster management, load balancing and other features as appropriate. The server 402 operates with any sort of conventional processing hardware 404, such as a processor 405, memory 406, input/output features 407 and the like. The input/output features 407 generally represent the interface(s) to networks (e.g., to the network 445, or any other local area, wide area or other network), mass storage, display devices, data entry devices and/or the like. The processor 405 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 406 represents any non-transitory short or long-term storage or other computer-readable media capable of storing programming instructions for execution on the processor 405, including any sort of random-access memory (RAM), read only memory (ROM), flash memory, magnetic or optical mass storage, and/or the like. The computer-executable programming instructions, when read and executed by the server 402 and/or processor 405, cause the server 402 and/or processor 405 to create, generate, or otherwise facilitate the application platform 410 and/or virtual applications 428 and perform one or more additional tasks, operations, functions, and/or processes described herein. It should be noted that the memory 406 represents one suitable implementation of such computer-readable media, and alternatively or additionally, the server 402 could receive and cooperate with external computer-readable media that is realized as a portable or mobile component or application platform, e.g., a portable hard drive, a USB flash drive, an optical disc, or the like.

The application platform 410 is any sort of software application or other data processing engine that generates the virtual applications 428 that provide data and/or services to the client devices 440. In a typical embodiment, the application platform 410 gains access to processing resources, communications interfaces and other features of the processing hardware 404 using any sort of conventional or proprietary operating system 408. The virtual applications 428 are typically generated at run-time in response to input received from the client devices 440. For the illustrated embodiment, the application platform 410 includes a bulk data processing engine 412, a query generator 414, a search engine 416 that provides text indexing and other search functionality, and a runtime application generator 420. Each of these features may be implemented as a separate process or other module, and many equivalent embodiments could include different and/or additional features, components or other modules as desired.

The runtime application generator 420 dynamically builds and executes the virtual applications 428 in response to specific requests received from the client devices 440. The virtual applications 428 are typically constructed in accordance with the tenant-specific metadata 438, which describes the particular tables, reports, interfaces and/or other features of the particular application 428. In various embodiments, each virtual application 428 generates dynamic web content that can be served to a browser or other client program 442 associated with its client device 440, as appropriate.

The runtime application generator 420 suitably interacts with the query generator 414 to efficiently obtain multi-tenant data 432 from the database 430 as needed in response to input queries initiated or otherwise provided by users of the client devices 440. In a typical embodiment, the query generator 414 considers the identity of the user requesting a particular function (along with the user's associated tenant), and then builds and executes queries to the database 430 using system-wide metadata 436, tenant specific metadata 438, pivot tables 434, and/or any other available resources. The query generator 414 in this example therefore maintains security of the common database 430 by ensuring that queries are consistent with access privileges granted to the user and/or tenant that initiated the request. In this manner, the query generator 414 suitably obtains requested subsets of data 432 accessible to a user and/or tenant from the database 430 as needed to populate the tables, reports or other features of the particular virtual application 428 for that user and/or tenant.

Still referring to FIG. 4, the data processing engine 412 performs bulk processing operations on the data 432 such as uploads or downloads, updates, online transaction processing, and/or the like. In many embodiments, less urgent bulk processing of the data 432 can be scheduled to occur as processing resources become available, thereby giving priority to more urgent data processing by the query generator 414, the search engine 416, the virtual applications 428, etc.

In exemplary embodiments, the application platform 410 is utilized to create and/or generate data-driven virtual applications 428 for the tenants that they support. Such virtual applications 428 may make use of interface features such as custom (or tenant-specific) screens 424, standard (or universal) screens 422 or the like. Any number of custom and/or standard objects 426 may also be available for integration into tenant-developed virtual applications 428. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 426 such as "account" objects, "opportunity" objects, "contact" objects, or the like. The data 432 associated with each virtual application 428 is provided to the database 430, as appropriate, and stored until it is requested or is otherwise needed, along with the metadata 438 that describes the particular features (e.g., reports, tables, functions, objects, fields, formulas, code, etc.) of that particular virtual application 428. For example, a virtual application 428 may include a number of objects 426 accessible to a tenant, wherein for each object 426 accessible to the tenant, information pertaining to its object type along with values for various fields associated with that respective object type are maintained as metadata 438 in the database 430. In this regard, the object type defines the structure (e.g., the formatting, functions and other constructs) of each respective object 426 and the various fields associated therewith.

Still referring to FIG. 4, the data and services provided by the server 402 can be retrieved using any sort of personal computer, mobile telephone, tablet or other network-enabled client device 440 on the network 445. In an exemplary embodiment, the client device 440 includes a display device, such as a monitor, screen, or another conventional electronic display capable of graphically presenting data and/or information retrieved from the multi-tenant database 430. Typically, the user operates a conventional browser application or other client program 442 (e.g., client application 107) executed by the client device 440 to contact the server 402 via the network 445 using a networking protocol, such as the hypertext transport protocol (HTTP) or the like. The user typically authenticates his or her identity to the server 402 to obtain a session identifier ("SessionID") that identifies the user in subsequent communications with the server 402. When the identified user requests access to a virtual application 428, the runtime application generator 420 suitably creates the application at run time based upon the metadata 438, as appropriate. As noted above, the virtual application 428 may contain Java, ActiveX, or other content that can be presented using conventional client software running on the client device 440; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to web pages and/or browsers, APIs, software development, testing, performance monitoring, tracing, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of tracking performance associated with a web page, the method comprising:
    providing, by a server, the web page to a client over a network, the web page including code executable by the client to provide one or more requests to the server over the network, assign tracing identifiers to the one or more requests and provide the tracing identifiers to the server and second code executable by the client to determine, at the client, a first set of performance metrics associated with the one or more requests based on one or more timestamps corresponding to the one or more requests;
    providing, by the server, one or more responses to the one or more requests to the client over the network;
    determining, by the server, a second set of performance metrics associated with providing the one or more responses;
    receiving, by the server, the first set of performance metrics from the client after providing the one or more responses; and
    maintaining, by the server, an association between the first set of performance metrics determined at the client and the second set of performance metrics using the tracing identifiers.

2. The method of claim 1, further comprising establishing, by the server, the association between the first set of performance metrics and the second set of performance metrics for a first request of the one or more requests using a first tracing identifier of the tracing identifiers, wherein the code causes the client to assign the first tracing identifier to the first request and transmit the first tracing identifier to the server with the first request.

3. The method of claim 2, wherein maintaining the association comprises the server generating a log entry in a database, wherein the log entry maintains the association between the first set of performance metrics, the second set of performance metrics and the first tracing identifier.

4. The method of claim 2, wherein maintaining the association comprises the server generating a message including the first set of performance metrics, the second set of performance metrics and the first tracing identifier.

5. The method of claim 1, wherein:
    determining the second set of performance metrics comprises determining a server-side performance metric based on a timing associated with a first request of the one or more requests;
    receiving the first set of performance metrics comprises receiving a client-side performance metric associated with the first request; and
    maintaining the association comprises maintaining the association between the server-side performance metric and the client-side performance metric using a tracing identifier associated with the first request.

6. The method of claim 5, further comprising:
    instructing, by the server, a database to determine a database performance metric associated with the first request; and
    receiving, by the server, the database performance metric from the database, wherein maintaining the association comprises maintaining the association between the server-side performance metric, the client-side performance metric, and the database performance metric using the tracing identifier.

7. The method of claim 1, the code comprising a reference to a script file maintained in a database, wherein providing the web page comprises:
    receiving, by the server from the client, a request for the script file during loading of the web page;
    obtaining, by the server, the script file from the database; and
    providing, by the server, the script file to the client.

8. The method of claim 7, wherein the client executes the script file to assign the tracing identifiers to the one or more requests and provide the tracing identifiers to a monitoring application program interface at the server, wherein the monitoring application program interface maintains the association between the first set of performance metrics and the second set of performance metrics using the tracing identifiers.

9. The method of claim 7, wherein the script file comprises a JavaScript file.

10. The method of claim 7, wherein the reference precedes executable portions of the code for the web page corresponding to the one or more requests.

11. A computer-readable medium having instructions stored thereon that are executable by a processing system of a server to:
    provide a web page to a client over a network, the web page including code executable by the client to provide one or more requests to the server over the network, assign tracing identifiers to the one or more requests and provide the tracing identifiers to the server and second code executable by the client to determine, at the client, a first set of performance metrics associated with the one or more requests based on one or more timestamps corresponding to the one or more requests;
    provide one or more responses to the one or more requests to the client over the network;
    determine a second set of performance metrics associated with providing the one or more responses;

receive the first set of performance metrics from the client after providing the one or more responses; and maintain an association between the first set of performance metrics determined at the client and the second set of performance metrics using the tracing identifiers.

12. The computer-readable medium of claim 11, wherein the code comprises a reference to a script file maintained in a database.

13. The computer-readable medium of claim 12, wherein the script file comprises a JavaScript file.

14. The computer-readable medium of claim 12, wherein the reference precedes executable portions of the code for the web page corresponding to the one or more requests.

15. A database system comprising:

a database including code corresponding to a web page; and a server coupled to the database and a network to:

provide the code corresponding to the web page to a client coupled to the network, the code including first code executable by the client to provide one or more requests to the server over the network and assign, to each of the one or more requests, a tracing identifier provided to the server with each of the one or more requests and second code executable by the client to determine, at the client, a first set of performance metrics associated with the one or more requests;

determine a second set of performance metrics associated with responding to the one or more requests;

receive the first set of performance metrics from the client after responding to the one or more requests; and create a log entry in the database to maintain an association between the tracing identifier for a respective request of the one or more requests, the first set of performance metrics determined at the client for the respective request, and the second set of performance metrics for the respective request.

16. The database system of claim 15, wherein the code comprises a script executable by the client.

17. The database system of claim 16, wherein the script comprises a file maintained in the database and referenced by the code.

18. The database system of claim 17, wherein the file comprises a JavaScript file.

19. The database system of claim 15, wherein:

the first set of performance metrics comprises a browser performance time for each of the one or more requests;

the second set of performance metrics comprises a server performance time for each of the one or more requests; and the log entry maintains the association between [[an]] the tracing identifier assigned to a respective request of the one or more requests, the browser performance time for the respective request, and the server performance time for the respective request.

20. The database system of claim 15, wherein a monitoring application program interface at the server receives the first set of performance metrics and creates the log entry.

\* \* \* \* \*

UNITED STATES PATENT AND TRADEMARK OFFICE
CERTIFICATE OF CORRECTION

PATENT NO. : 11,210,198 B2
APPLICATION NO. : 16/262706
DATED : December 28, 2021
INVENTOR(S) : Dillon, Jr. et al.

Page 1 of 1

It is certified that error appears in the above-identified patent and that said Letters Patent is hereby corrected as shown below:

In the Claims

In Column 18, Line 21, "between [[an]] the" should be changed to --between the--

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*